Jan. 16, 1968 SUSUMU KAWASE ET AL 3,364,498
PAPER FEED APPARATUS FOR A GRAPHIC
COMMUNICATION RECORDING STATION
Filed June 20, 1966 5 Sheets-Sheet 1

INVENTORS
SUSUMU KAWASE
JUNJIRO KUBOTA
KATSUHIKO MORI
BY Wallace, Kinzer & Dorn
ATTYS.

Jan. 16, 1968 SUSUMU KAWASE ET AL 3,364,498

PAPER FEED APPARATUS FOR A GRAPHIC COMMUNICATION RECORDING STATION

Filed June 20, 1966 5 Sheets-Sheet 2

INVENTORS
SUSUMU KAWASE
JUNJIRO KUBOTA
KATSUHIKO MORI
BY Wallace, Kinzer & Dorn
ATTYS Jan. 16, 1968 SUSUMU KAWASE ET AL 3,364,498

PAPER FEED APPARATUS FOR A GRAPHIC COMMUNICATION RECORDING STATION

Filed June 20, 1966 5 Sheets-Sheet 3

INVENTORS
SUSUMU KAWASE
JUNJIRO KUBOTA
KATSUHIKO MORI

BY Wallace, Kinzer & Dorn ATTYS.

Jan. 16, 1968 SUSUMU KAWASE ET AL 3,364,498

PAPER FEED APPARATUS FOR A GRAPHIC COMMUNICATION RECORDING STATION

Filed June 20, 1966 5 Sheets-Sheet 4

INVENTORS
SUSUMU KAWASE
JUNJIRO KUBOTO
KATSUHIKO MORI

BY Wallace, Kinzer & Dorn
ATTYS.

INVENTORS
SUSUMU KAWASE
JUNJIRO KUBOTA
KATSUHIKO MORI
BY Wallace, Kinzer & Dorn
ATTYS.

United States Patent Office 3,364,498

Patented Jan. 16, 1968

3,364,498

PAPER FEED APPARATUS FOR A GRAPHIC COMMUNICATION RECORDING STATION

Susumu Kawase, Junjiro Kubota, and Katsuhiko Mori, Tokyo, Japan, assignors to Nippon Electric Company Limited, Tokyo, Japan, a corporation of Japan Filed June 20, 1966, Ser. No. 558,713
Claims priority, application Japan, Jan. 31, 1966, 41/5,485
5 Claims. (Cl. 346—136)

This invention relates to record communication systems and more particularly to a paper feed apparatus for a graphic communication system of the kind in which handwritten data, including message, sketches, and the like are recorded by a stylus at a transmitter station and are simultaneously and automatically reproduced at a receiver station in response to electrical signals from the transmitter.

In such graphic communication systems, it is necessary to replace a used length or segment of recording paper with a new segment at irregular intervals, depending upon the data being transmitted. When a new segment of recording paper (or other recording medium) is required for the system, the paper webs must be replaced simultaneously and rapidly at the transmitter and at the receiver in order to obtain maximum efficiency in operation of the communication system.

In many instances, and particularly where pre-printed recording forms are employed, precision in advancement of the recording paper web is essential in order that the information recorded at the receiver will have the same position on the pre-printed forms as the data recorded at the transmitter.

Another requirement of systems of this kind, is that the paper or other recording medium must be maintained in full flat engagement with the writing platen, both at the transmitter and at the receiver. The recording pens utilized in the receivers are usually very light in weight, and any wrinkling or other distortion in the recording surface is reflected in disturbances in the recorded data. If the paper web is skewed, particularly at the receiver, alignment of the recorded data with the pre-printed form may not be achieved, creating confusion in the recording. Furthermore, an unexpected lifting of the transmitter pen due to a wrinkle in the paper may cause a corresponding lift of the receiver pen and may result in omission of a part of the transmitted data.

Several types of paper feed apparatus have been proposed for communication systems of this kind. For example, reference may be made to U.S. Patent No. 3,031,209, pertaining to a paper alignment compensator, and to U.S. Patent No. 3,114,490, relating to a belt drive paper feed mechanism. These systems, although quite capable of effective operation under many circumstances, present difficulties, particularly where precise feeding of the paper for the utilization of pre-printed forms is required.

A principal object of the present invention, therefore, is to afford a unique paper feed apparatus for synchronously feeding the recording paper at either a transmitter or receiver, in a graphic communication system of the kind described above, that is effective to retain the recording paper in flat surface-to-surface contact with the writing platen upon which data is to be recorded.

Another important object of the invention is to afford a new and improved paper feed apparatus for a graphic communication recording system which effectively controls the length of paper feed wtih a precision sufficient to permit the utilization of pre-printed form segments on the paper, yet which controls the length of paper feed independently of other stations in the communication system.

Another object of the present invention is to provide a new and improved paper feed apparatus in which the length of paper feed in each operation is determined by the recording paper itself, permitting the utilization of different pre-printed forms of varying lengths with no modification of the paper feed apparatus.

A specific object of the invention is to provide a new and improved paper feed apparatus that includes a paper drive mechanism which maintains a paper web under substantial tension at all times, whether the paper web is stationary upon a writing platen or is being moved across that platen to replace the recording surface.

An additional object of the invention is to afford a new and improved paper feed apparatus for a graphic communication recording station that is substantially immune to changes in temperature and humidity yet is simple and inexpensive in construction and easy to adjust and maintain.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

Figure 1:
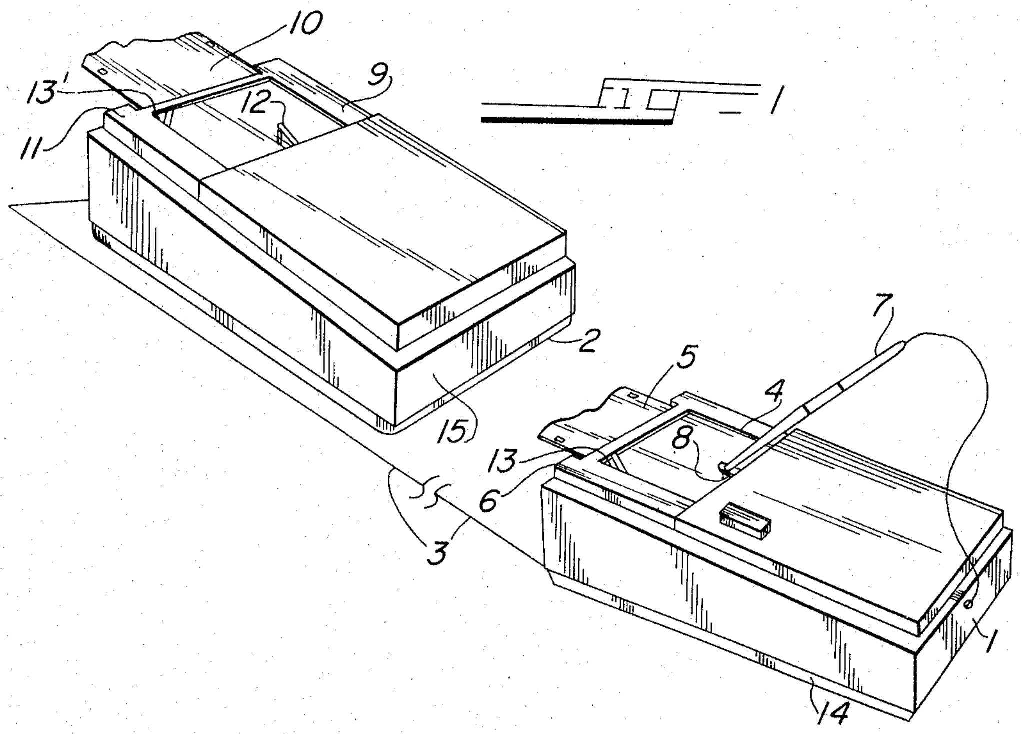
FIG. 1 is a perspective view, partially schematic, of a graphic communication system in which the present invention is employed, and includes transmitter and receiver apparatus.

The graphic communication system illustrated in FIG. 1 comprises a transmitter 1 and a receiver 2 that are connected to each other by means of an appropriate transmission link generally indicated by the transmission line 3. The transmitter 1 comprises a writing surface or platen 4 across which a web or strip 5 of recording paper extends. The paper web 5 is fed across the platen 4 by a paper feed apparatus 6, indicated only generally in FIG. 1 and discussed in greater detail hereinafter. The transmitter further includes a recording pen 7 that is mechanically connected by a link 8 to the operating components of the transmitter. The link 8 connects the pen 7 to converter units, within the transmitter, which translate movements of the pen into coordinate position signals. The transmitter further includes means for developing a pen contact signal indicating whether the pen 7 is in engagement with the recording paper 5. The coordinate position signals and the pen contact signal are transmitted over the transmission line 3 to the receiver 2.

The linkage 8, the electrical converter circuits, the transmitting circuits and the other components of the transmitter 1 may be basically similar to constructions for graphic recording apparatus of this general kind; for example, the circuits and components of U.S. Patent No. 2,583,535 may be employed. The particular form of converter apparatus and transmitter apparatus selected for use in the system is not critical to the present invention. Consequently, these components of the transmitter are not illustrated and no further detailed explanation is provided.

The receiver 2 comprises a writing surface or platen 9. A web 10 of recording paper or other appropriate recording medium is stretched across and is supported upon the platen 9. The paper web 10 corresponds fully to the paper web 5 employed at the transmitter. A paper feed unit 11, indicated only generally in FIG. 1, is utilized to advance the paper web 10 across the recording surface 9 and to maintain the paper web under tension.

The receiver further includes a recording pen 12 and an appropriate linkage mechanism for driving the pen 12 across the surface of the recording paper 10 on surface 9, together with appropriate apparatus for moving the recording pen into and out of contact with the paper. Again, the electrical converter and control circuits and the linkage mechanism may be constructed in accordance with known prior art devices and require no detailed explanation herein. It is sufficient to note that the recording pen 12 is moved across the paper surface in response to the coordinate signals from the transmitter 1 and is moved into and out of contact with the paper 10 in response to the pen contact signals from the transmitter, so that a massage or other data written at the transmitter 1 is faithfully recorded, virtually simultaneously, at the receiver 2.

The present invention is directed to a paper feed mechanism that may be employed for either the transmitter 1 or the receiver 2. The paper feed apparatus is basically the same in each of the transmitter and receiver units.

When the segment of the recording paper 5 on the writing surface 4 of the transmitter 1 has been filled with information, or when a message is terminated and it is desired to start a further recording operation, the necessity for a new segment of paper at the transmitter is duplicated at the receiver 2. Thus, for the next message, or for continuation of the previously recorded data, it is necessary to replace the segments of both the recording papers 5 and 10 with new fresh segments capable of receiving additional data. The writing area at the receiver is a substantial duplicate of that at the transmitter, so that the advance of the paper web 10 should match the feeding movement of the paper web 5.

To replace the recording paper at both the transmitter and receiver, the transmitter pen 7 is moved to a specific position on the writing surface 4. For example, in the illustrated construction the pen 7 is moved to the corner of the writing surface identified by the reference numeral 13. This movement of the transmitter pen completes an electrical circuit that actuates a paper feed switch and causes the paper feed mechanism 6 to advance the recording paper 5 across the surface 4 and bring a new fresh section of recording paper into recording position on the surface 4.

During the paper feed operation at the transmitter, the receiver pen 12 is moved to the corresponding position 13′ on the receiver recording surface 9. As in the case of the transmitter, this movement of the pen actuates a paper feed switch and energizes the paper feed mechanism of the receiver to advance the paper web 10 across the surface 9 and position a fresh segment of the paper web in recording position on the receiver platen. The paper feed apparatus of the present invention assures automatic control of the advancing movements of the two paper webs, independently of each other, so that each is advanced by exactly the required distance, as described in detail hereinafter.

Figure 2:
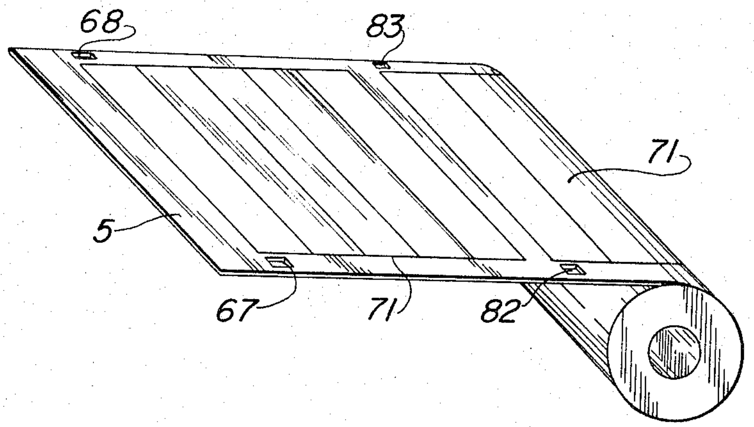
FIG. 2 illustrates a web of recording paper or like material, pre-printed in individual "form" or "slip" segments, used in the present invention.

FIG. 2 illustrates a typical recording paper web employed as either the transmitter recording paper 5 or the receiver recording medium 10. As shown in FIG. 2, the paper web is pre-printed with a series of individual "slip" or "form" segments 71. The paper web is furnished in a roll, in a typical installation, although a folded arrangement may be utilized for preliminary storage of the preprinted paper web if desired. The edges of the paper web are provided with indexing apertures 67, 68, 82 and 83 which are located in precisely predetermined positions relative to the printed form segments 71.

Figure 3:
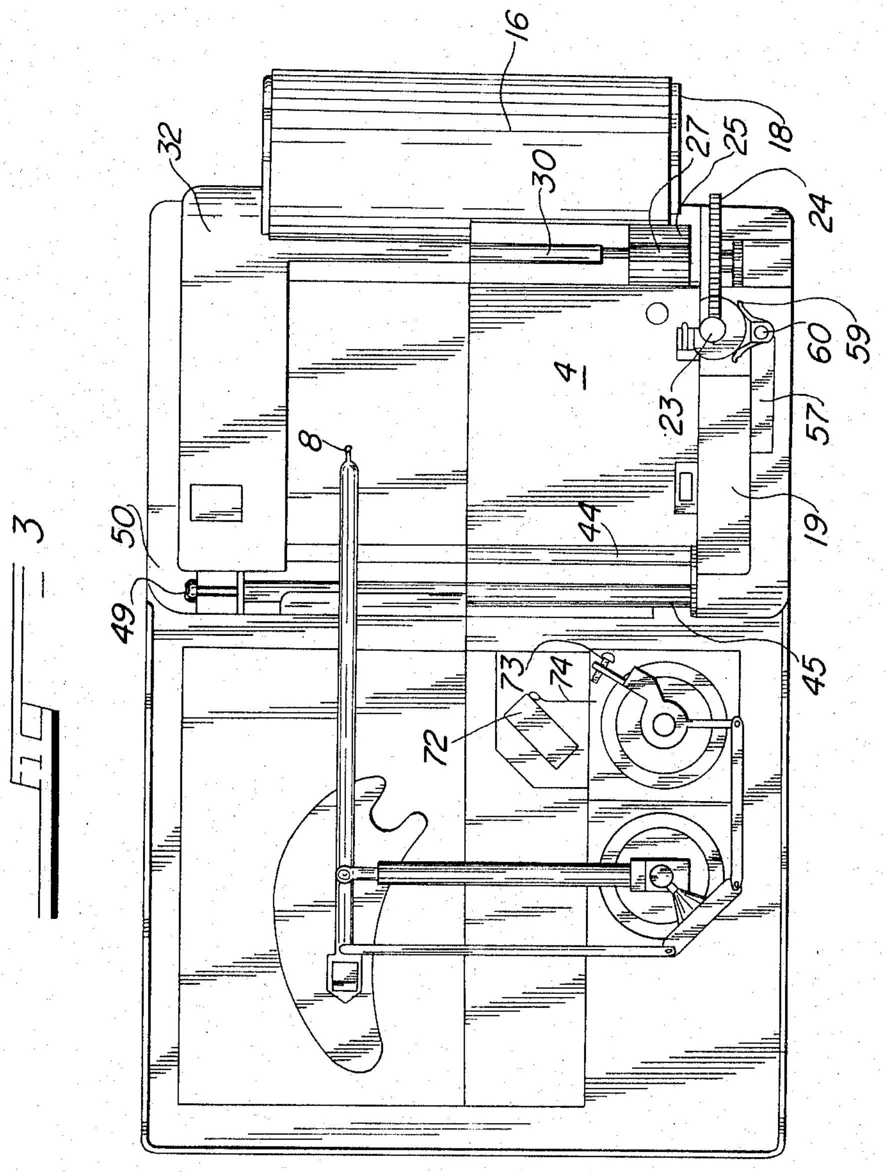
FIG. 3 is a plan view of a graphic communication receiver incorporating a paper feed apparatus constructed in accordance with the present invention, the cover of the receiver being removed to illustrate the operating components of the receiver and of the paper feed.

FIG. 3 is a plan view of a graphic communication station in which the paper feed apparatus of the present invention is incorporated, with the cover of the communication station removed. That is, FIG. 3 may be considered to represent a plan view of the transmitter 1 with the cover 14 removed or the receiver 2 with its cover 15 removed (see FIG. 1). The relationship of the paper feed apparatus to other portions of the graphic communication station are the same in either instance.

Figure 4:
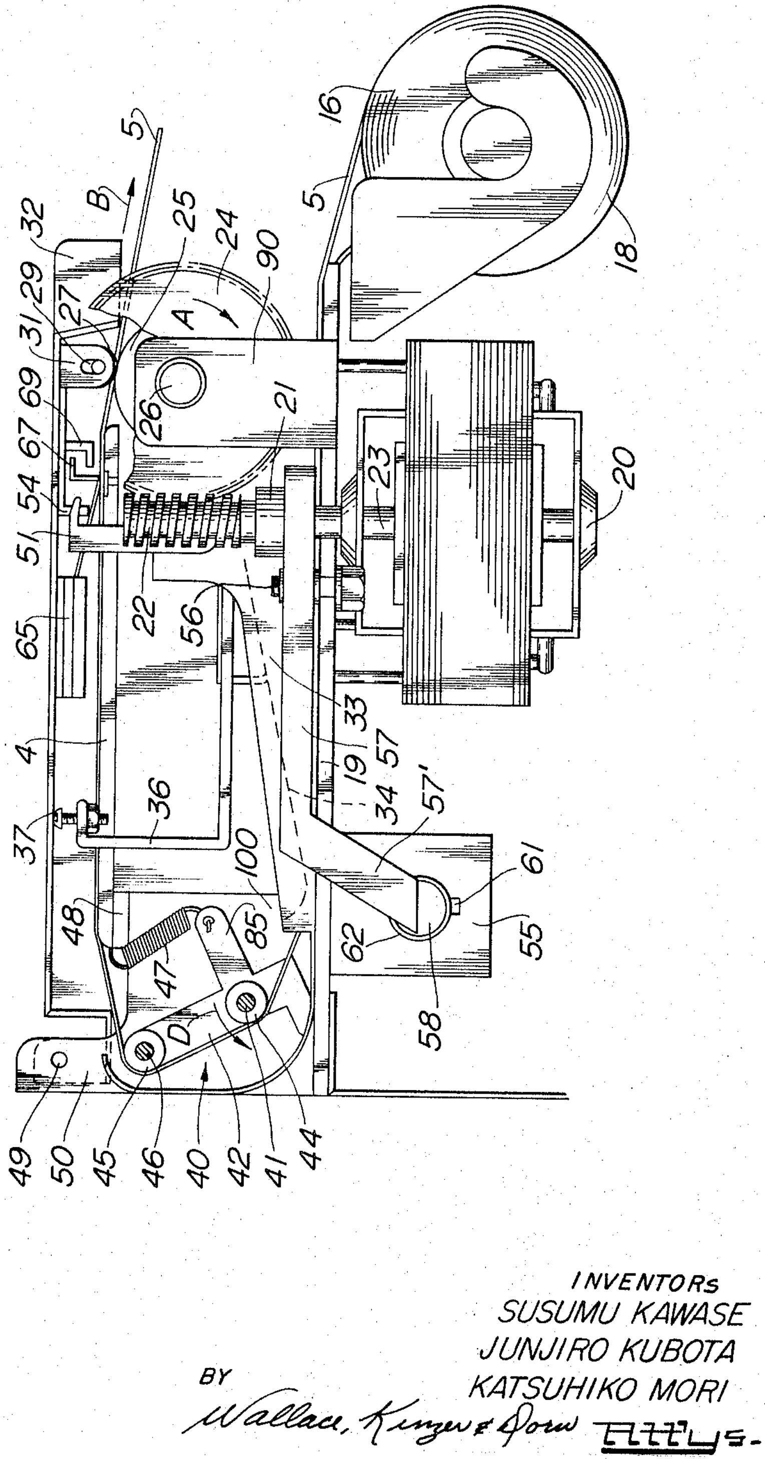
FIG. 4 is an elevation view, partly in cross section, of the paper feed apparatus of the present invention.

As shown in FIG. 4, the paper web 5 is stored in the form of a roll 16; in the ensuing description of the paper feed mechanism, it will be assumed that the transmitter is illustrated in the drawings, although it should be understood that all are equally applicable to the receiver of the system. The paper roll 16 is suspended between appropriate brackets 18, by means of a shaft 17. The brackets 18, in turn, are supported from the frame 19 of the graphic communication station.

A paper feed motor 20 is mounted upon frame 19, being suspended below the frame. A brake disc 21 and a worm gear 22 are mounted upon the upper portion of the shaft 23 of the motor 20 as best shown in FIG. 4.

The worm gear 22 is disposed in meshing engagement with a worm wheel 24 that is mounted upon a shaft 26, this relationship being best illustrated in FIGS. 3 and 4. A feed roller 25, preferably covered at its ends with frictional material such as rubber or the like, is also mounted upon shaft 26. The shaft 26 extends between a pair of brackets 90 that are affixed to and project upwardly from the frame 19 (see FIG. 4). The worm wheel 24 and the feed roller 25 are connected to each other for conjoint rotation and both are freely rotatable about the shaft 26.

Figure 5:
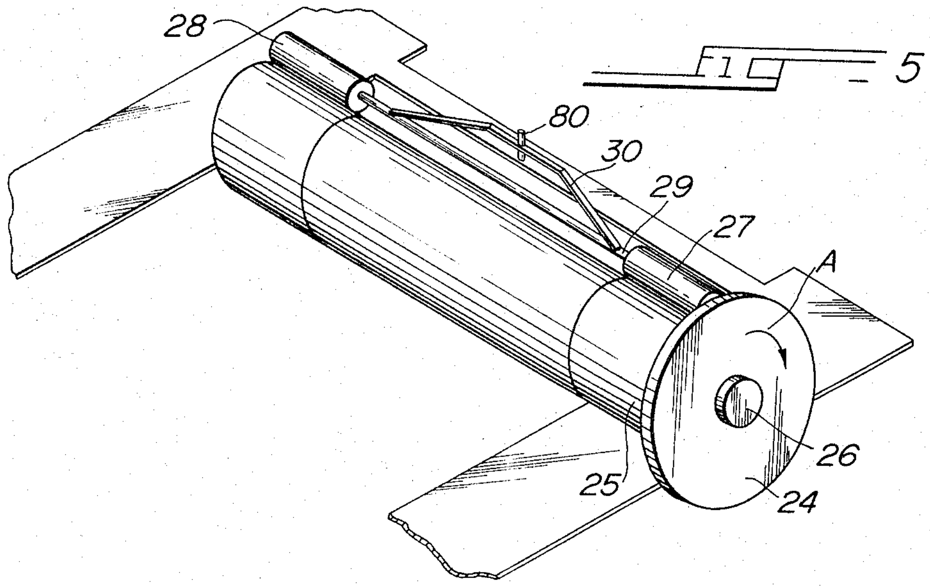
FIG. 5 is a detail perspective view of a paper feed roller and pressure mechanism employed in the paper feed apparatus of FIG. 4.

A pair of pressure rollers 27 and 28 are aligned with the feed roller 25. The pressure rollers 27 and 28 are freely rotatably mounted upon a shaft 29. The shaft 29, in turn, is suspended from the cover 32 of the paper feed mechanism (FIG. 4) by a pair of appropriate brackets 31. A leaf spring 30, held in position by a fulcrum member 84, presses down on the shaft 29 to maintain a uniform pressure engagement between the two pressure rollers 27 and 28 and the main feed roller 25. Thus, upon rotation of the worm wheel 24 and the main feed roller 25 as indicated by the arrows A in FIGS. 4 and 5, the paper web 5 is advanced through the recording apparatus in the direction indicated by arrow B, FIG. 4.

Figure 6:
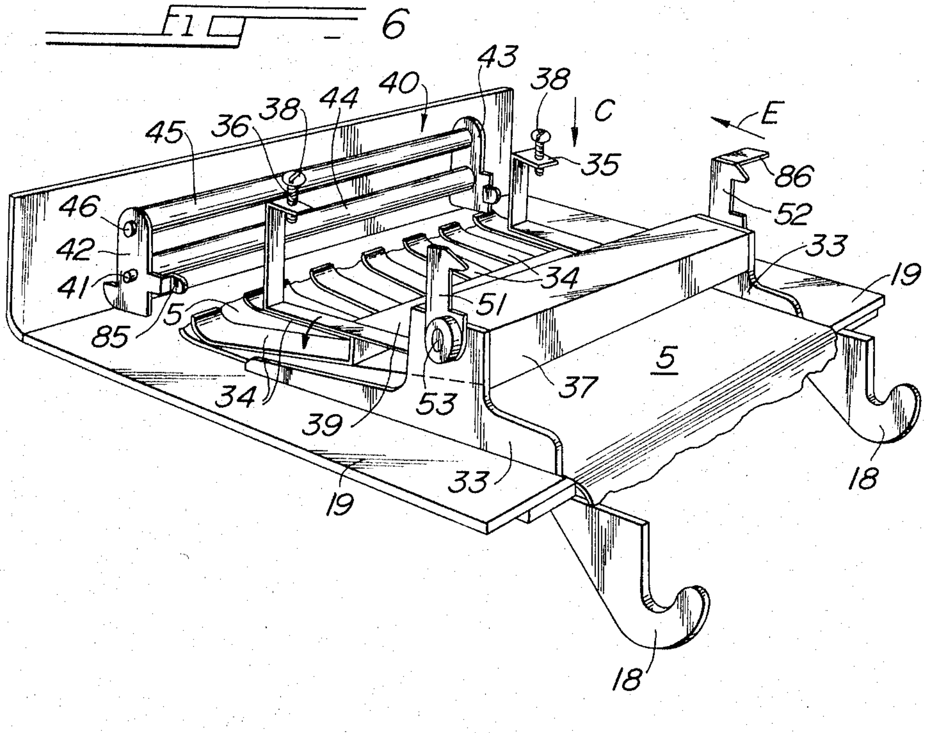
FIG. 6 is a detail perspective view of a part of the paper feed mechanism employed to maintain tension on the recording paper.

In FIG. 6, the feed roller 25, the lid 32, and other components are omitted in order to afford a better illustration and clearer explanation of a part of the tensioning means of the paper feed mechanism. As shown in FIG. 6, a pair of fixed guides 33 are mounted upon the frame 9. The guides 33 guide the edges of the paper web 5. The guides 33 further afford a support for a static tension mechanism 39 that is best illustrated in FIG. 6.

The static tension mechanism 39 includes a pair of arms 35 and 36 located at opposite sides of the paper feed mechanism. The static tension mechanism further includes a plurality of leaf springs 34 that are mounted upon a carrier member 37, the carrier member 37 being in turn mounted upon a shaft 53 that extends between the guides 33. When the arms 35 and 36 are located in the direction indicated by the arrow C, the leaf springs 34 press the paper web 5 against the frame 19. Consequently, the recording paper web which is caught between the springs 34 and the frame 19 is maintained under tension and thus held closely against the writing surface or plate 4 (FIG. 4). Furthermore, the springs 34 maintain a fixed positional relation between the writing plate 4 and the recording paper 5 when the paper is not being advanced.

In the construction shown in FIG. 4, the required load upon the spring arms 35 and 36 is applied by means of the lid 32, engaging a pair of tension control screws 38. When the lid 32 is elevated to an open position, as indicated generally by the phantom outline 32', the arms 35 and 36 are released. This releases the force bearing down upon the leaf springs 34 and facilitates threading of the recording paper across the surface of the frame 19 between the guides 33, as may be required whenever the supply of paper on the roll 16 is depleted or when a different printed form is to be used.

The static tension mechanism 39 is supplemented by a dynamic tension mechanism 40 which holds the recording paper 5 closely against the platen 4 when the paper web is being advanced across the writing plate. The dynamic tension mechanism 40 has the further function of absorbing any slack in the recording paper 5, between the points of engagement of the recording paper with the static tension mechanism 39 and the main feed roller 25, when the movement of the paper web is interrupted at the end of a paper feed operation.

The dynamic tension mechanism 40 comprises a shaft 41 that extends across frame 19. The shaft is supported in two members 100 that comprise a part of the fixed frame. A pair of brackets 42 and 43 are freely pivotally mounted upon the fixed shaft 41. Between the brackets 42 and 43 there is a guide roller 44 that is concentric with the shaft 41. The dynamic tension mechanism 40 further includes a tension roller 45 that is supported upon a shaft 46, the shaft 46 extending from bracket 42 to bracket 43. A spring 47 is connected to an arm 85 on the bracket 42, the other end of the spring being engaged in a hook 48 that is a part of the frame 19. The spring 47 biases the dynamic tension mechanism 40 toward rotation in the direction indicated by arrow D in FIG. 4.

The hinge 50 of the lid 32 for the paper feed mechanism (FIG. 4) is pivotally mounted upon a shaft 49 that extends across the frame 19 between the brackets 100. As noted above, the lid 32 opens upwardly from the position shown in FIG. 4, as generally indicated by the phantom outline 32'; a greater opening movement is usually permitted to give better access to the paper feed mechanism for a threading operation. In normal use, the lid 32 is held in its closed position, as shown in solid lines in FIG. 4, by a pair of latch members 51 and 52 which engage a transverse bar 54 secured to the lid. With the lid closed, as noted above, the pressure rollers 27 and 28 press the paper web against main feed roller 25 to permit advancement of the recording paper across the writing plate 4 upon rotation of the main feed roller in the direction indicated by the arrow A.

To thread the recording paper into the paper feed mechanism, the lever 86 connected to the latch member 52 (see FIG. 6) is moved in the direction of the arrow E. This releases the engagement of the latch members 51 and 52 with the bar 54 and permits raising of the lid 32 (FIG. 4). Lifting of the lid releases the static tension mechanism 39 as described above, permitting easy threading of the paper 5 through the mechanism.

Figures 7, 8, 9:
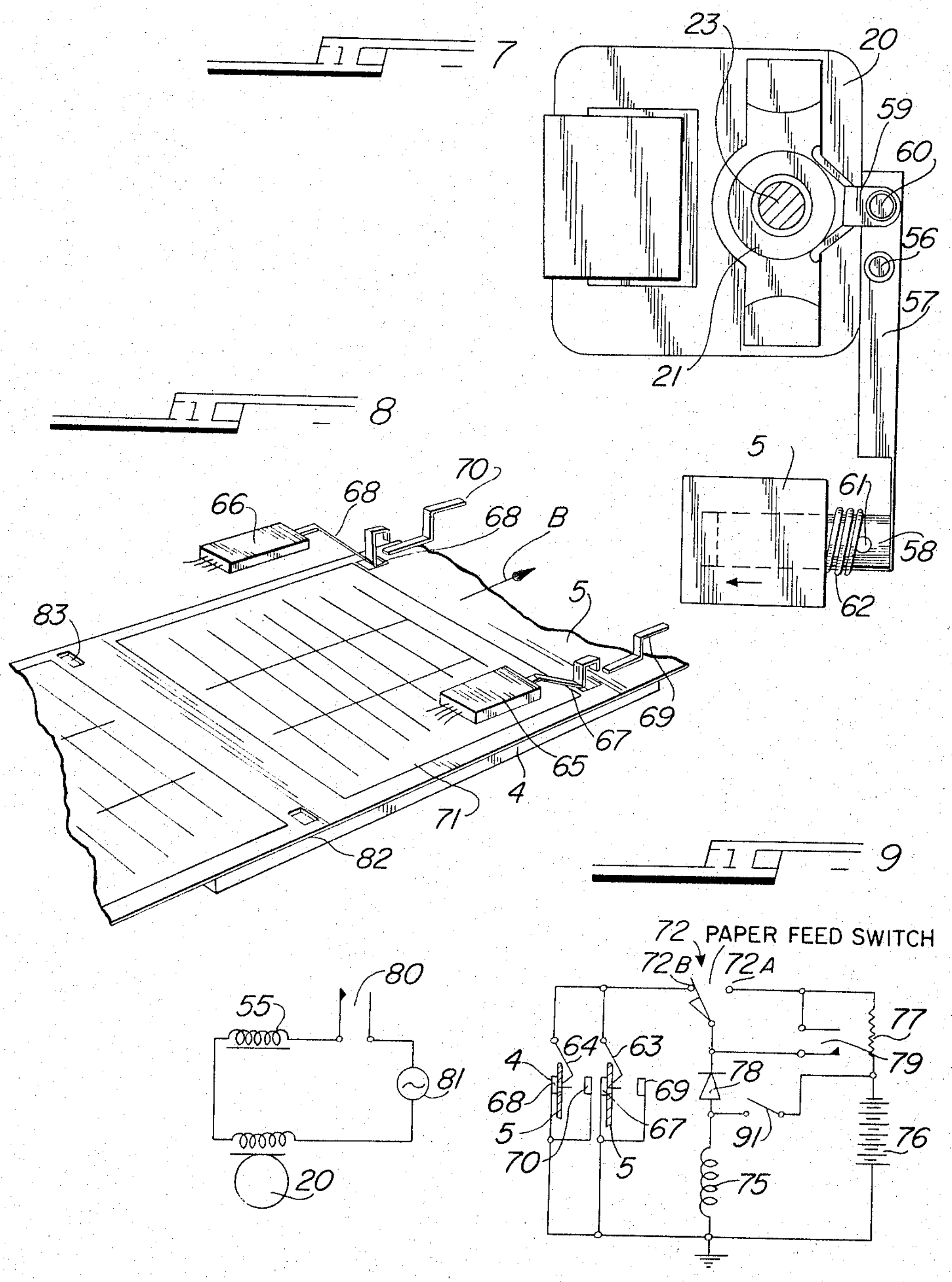
FIG. 7 is a detail view of the paper feed motor and related brake mechanism.
FIG. 8 is a detail perspective view of the detector mechanism of the paper feed apparatus that controls paper feed movement.
FIG. 9 is a circuit diagram of the electrical control for the paper feed apparatus.

FIG. 7 illustrates the brake mechanism for the paper drive motor 20. The paper feed motor 20 and a brake solenoid 55 are both mounted on the machine frame 19; see FIGS. 4 and 7. A short shaft or fulcrum member 56 is mounted on the frame 19 and projects above the lower portion of the frame, as shown in FIG. 4. A brake lever 57 is pivotally mounted upon the fulcrum member 56. A depending portion 57' on the lever 57 is mechanically connected to the armature 58 of the brake solenoid 55 by appropriate means such as a pen 61. At the other end of the brake lever 57, a brake shoe 59 is pivotally mounted on the brake lever by means of a shaft 60 or other appropriate mounting arrangement. The armature 58 of the brake solenoid 55 is provided with a restoring spring 62. Ordinarily, the spring 62 biases armature 58 outwardly of the solenoid 55 and thus biases the lever 57 in a counterclockwise direction as seen in FIG. 7. Accordingly, it is seen that the action of the spring 62 normally maintains the brake shoe 59 in frictional engagement with the brake disc 21 that is mounted upon the paper feed motor shaft 23.

To initiate a paper feed operation, electrical energizing circuits are simultaneously completed to the paper feed motor 20 and to the brake solenoid 55; typical electrical control circuits for accomplishing this action are described hereinafter. Upon excitation of the brake solenoid 55, the armature 58 is pulled inwardly of the solenoid, against the bias of spring 62. The inward movement of the armature 58 pivots the brake lever 57 in a clockwise direction (FIG. 7) and disengages the brake shoe 59 from the brake disc 21. This releases the operating shaft 23 of the paper feed motor and the paper feed motor starts to rotate.

Rotation of the paper feed motor shaft 23 causes corresponding rotation of the worm gear 22 and in turn drives the worm wheel 24. As a consequence, the worm wheel and its associated main paper feed roll 25 rotate in the direction of the arrows A (FIGS. 4 and 5) and initiate feeding of the paper web 5 in the direction of the arrow B (FIG. 4).

To stop the advancing movement of the recording paper web, the power supplies for the paper feed motor 20 and the brake solenoid 55 are simultaneously interrupted. When this occurs, the spring 62 drives the solenoid armature 58 outwardly of the solenoid, pivoting the brake lever 57 counterclockwise back to the position illustrated in FIG. 7. This movement forces the brake shoe 59 against the brake disc 21 and stops rotation of the motor shaft 23. The brake mechanism thus materially assists in precision stopping of the paper feeding movement, in that it overcomes the inertia of the motor 20 and the drive mechanism that is actuated by the motor. The free pivotal mounting of the brake shoe 59 on the shaft 60, taken in conjunction with the provision of a wear-resisting material with a high friction coefficient on the surface of the brake disc 21, affords a highly efficient and effective yet long wearing brake mechanism.

Precision control of the final position of the paper web 5 upon the platen 4 is effected by the control apparatus of the paper feed mechanism, portions of which are illustrated in FIGS. 8 and 9. The control mechanism includes a pair of spring detector contacts 63 and 64. The spring contact 63 is mounted on the lower surface of the lid 32 by means of an insulator block 65 (FIG. 4). Similarly, the spring contact 64 is supported from the lower surface of the lid by means of an insulator block 66 (FIG. 8).

A fixed contact 69 is mounted on the end surface of the lid 32 and is aligned with the spring contact 63. Similarly, a fixed contact 70 is located at the opposite side of the mechanism in alignment with the spring contact 64. When the lid 32 is closed as shown in FIG. 4, the two detector contacts 63 and 64 engage the platen 4 (or the paper web 5) and are held up in a position clear of their mating contacts 69 and 70, this being the relationship illustrated in FIG. 8. On the other hand, if the lid 32 is elevated to its open position, the contacts 63 and 69 close upon each other and contacts 64 and 70 engage each other.

As noted above, the recording paper web 5 is provided with indexing perforations or holes 67 and 68 that are accurately aligned with the printed form segments 71 of the paper web. During feeding movement of the paper web in the direction of the arrow B, the indexing apertures 67 and 68 reach a point of alignment with the detector contacts 63 and 64. When this occurs, an electrical circuit is completed between each of the contacts 63 and 64 and the platen 4, which is formed of conductive material. If an insulator is used as the writing plate 4, appropriate printed circuits or other electrical connections can be made to complete these electrical circuits. On the other hand, at all other times when the paper is advancing across the writing plate, the contacts 63 and 64 are insulated from the platen by the paper web 5.

The control circuit for the paper feed mechanism is illustrated in FIG. 9. As shown therein, it comprises a DC power supply 76, represented as a battery, having one terminal connected to system ground. The other terminal of the power supply is connected through a resistor 77 to one fixed contact 72A of a paper feed switch 72. The paper feed switch 72 is the switch that is actuated by movement of the transmitter pen 7 to the corner 13 of the writing surface as described above in connection with FIG. 1; in the receiver, the switch 72 is the paper feed switch that is actuated upon movement of the receiver pen 12 to the corner 13′ of the receiver writing surface. As shown in FIG. 9, the paper feed switch 72 is a single-pole double-throw switch that is normally closed upon a second fixed contact 72B.

The movable contact of the paper feed switch 72 is connected through a diode 78 to one terminal of a paper feed control relay coil 75. The other terminal of the operating coil for relay 75 is returned to system ground.

The paper feed control relay 75 includes two sets of normally open contacts 79 and 80. The one set of contacts 79 is connected in a holding circuit for the relay, this circuit extending from the resistor 77 to the diode 78 in a parallel circuit with respect to the paper feed switch 72. The other relay contacts 80 are connected in a series circuit from an AC power supply 81 to the paper feed motor 20 and the paper feed solenoid 55. It will be recalled that, for paper feed operation, the motor 20 and the solenoid 55 are energized simultaneously.

The contact 72B of paper feed switch 72 is connected to each of the spring detector contacts 63 and 64. The electrically conductive platen 4 is connected to system ground. The detector circuit illustrated in FIG. 9 further shows the contacts 69 and 70, both of which are returned to system ground. For fast paper feed under manual control, a manually actuatable switch 91 is connected directly from the power supply 76 to the relay coil 75, bypassing the paper feed switch 72 and the diode 78.

A paper feed operation is initiated, as described above, by momentary actuation of the paper feed switch 72, closing the movable contact of the switch pen on fixed contact 72A in response to movement of the transmitter or receiver pen into the selected corner portion of the writing area. Thus, a part of the pen linkage 73 (FIG. 3) may engage the switch lever 74 to operate switch 72 when the pen reaches the paper feed position.

Upon actuation of the paper feed switch 72, the relay coil 75 (FIG. 9) is energized through a circuit that extends from the power supply 76 through resistor 77 and switch 72 and through diode 78 to the relay coil and back to ground. Actuation of the relay closes the relay contacts 79 and 80. Closing of the contacts 79 establishes a holding circuit for the relay coil 75, maintaining the relay energized even though the recording pen may be moved and paper feed switch 72 may thus open. The closing of contacts 80, on the other hand, maintains the paper feed mechanism in operation, advancing the paper web 5 as described above by releasing the brake mechanism actuated by the solenoid 55 and energizing the paper feed motor 20.

As soon as the paper feed operation is initiated, the advancing movement of the paper web clears the indexing apertures 67 and 68 from their previous position of alignment with the sensing contacts 63 and 64 respectively. Under these circumstances, the paper feed operation is maintained despite the fact that the paper feed switch 72 is released and returns to the position illustrated in FIG. 9.

When the next succeeding set of indexing apertures 82 and 83 on the paper web 5 (FIG. 8) reach alignment with the detector contacts 63 and 64, the two sensing contacts engage the underlying conductive platen 4. As soon as the detector contacts engage the platen, an effective circuit is established, through contact 72B of switch 72, bypassing the relay coil 75. This shunting of the relay coil effectively de-energizes the relay so that the contacts 79 and 80 open. This de-energizes the paper feed motor 20, stopping the drive for the paper feed apparatus. At the same time, the solenoid 55 is de-energized and the paper feed brake is applied as described above. Accordingly, the advance of recording paper is interrupted at the precise position defined by the apertures in the paper, positioning the next pre-printed segment 71 of the paper web in accurate alignment on the platen 4 (FIG. 8).

The contacts 69 and 70 have no function in connection with the normal feeding of paper through the mechanism. When the lid of the paper feed mechanism is lifted, however, as noted above, contacts 63 and 69 close and contacts 64 and 70 close. Each contact pair establishes a shunt circuit, with respect to the relay 75, that is maintained continuously as long as the lid of the paper feed mechanism is held open. Hence, a normal paper feed cycle cannot be initiated with the lid open. The manual switch 91 is utilized to energize the relay 75 independently of the main control circuit to advance the paper web under specialized circumstances as when a new paper web is being fed into the mechanism or when some other system requirement necessitates a local advance of paper without a corresponding advance at other stations.

The electrical control circuit illustrated in FIG. 9 operates on the basis of establishment of direct electrical circuits from the detector contacts 63 and 64 to the platen 4, a system sometimes referred to as resistance detection. On the other hand, if desired, photoelectric detectors can be used with respect to the indexing apertures in the paper web. Furthermore, mechanical switches actuated by spring plungers extending through the indexing apertures can be employed if desired. The resistance detection arrangement specifically illustrated is usually preferred.

The paper feed mechanism is described above as relating particularly to the transmitter 1. However, and as indicated before, the paper feed apparatus and its control circuit are the same as those required for the receiver 2. Referring to FIG. 3, it should be noted that the transmitter pen 7 may be considered as representative also of the receiver pen 12 and the linkage connecting the pen to the paper feed switch 72 can be the same in each instance. The operation of the paper feed mechanisms at the transmitter and at the receiver, including the starting of the paper feed motor and the automatic interruption upon alignment of the indexing holes with the detecting contact are identical in both instances. On the other hand, the operation at the receiver is independent, in its control, from the transmitter operation, once operation is initiated, so that precision control is maintained of the paper feed even if the paper feed motors of the two communication stations function at substantially different speeds. By using substantially identical recording paper strips at the transmitter and at the receiver, the paper advance can be stopped with a new pre-printed form aligned accurately at the recording position regardless of variations in speed of operation of the paper feed mechanisms.

The paper feed mechanism of the present invention provides for the positioning of the paper web in accurate alignment at both the transmitter and receiver; the operation is precise and reliable, a consideration of prime importance where pre-printed forms are employed. The paper feed apparatus is essentially immune to a wide range of changes in temperature and humidity. The equipment is simple in construction, moderate in price, and easy to adjust and maintain. By changing the spacing between the index holes in the paper web, pre-printed forms of virtually any length, up to the full length of the recording surfaces of the machines, can be used with no modification of the basic communication apparatus.

While the principles of the invention have been described above in connection with preferred illustrative embodiments of this invention, further variation or modification may be accomplished without substantially departing from the basic spirit of this invention.

We claim:

1. A paper feed apparatus for a graphic communication recording station of the kind in which data are recorded by a stylus moving across a segment of a paper web or other recording medium supported upon a platen, and in which paper feed of a precise length is required substantially simultaneously with a corresponding paper feed at a remote station, comprising: a supply of a paper web having indexing apertures spaced longitudinally thereof at said paper feed length; guide means for guiding said web from said supply to said platen; a paper advancing mechanism for advancing said paper web through said guide means and across said platen; tensioning means for maintaining said paper web under substantial tension within said guide means and at both ends of said platen; energizing means for energizing said paper advancing mechanism upon movement of said stylus to a predetermined location on said platen and for maintaining said paper advancing mechanism energized thereafter; detector means, coupled to said energizing means, for detecting movement of one of said indexing apertures to a given position indicative of advancement of said paper web through said paper feed length and for de-energizing said paper advancing mechanism in response thereto; and a brake mechanism, coupled to said energizing means, for automatically braking said paper advancing mechanism immediately upon de-energization of said paper advancing means.

2. A paper feed apparatus for a graphic communication recording station, according to claim 1, in which said tensioning means comprises a static resilient tensioning device engaging said paper web within said guide means, a second static tensioning device incorporated in said paper advancing mechanism to apply tension to the portion of the paper web extending across said platen, and a dynamic tensioning device interposed between said static tensioning devices to take up any slack present upon completion of a paper feeding movement of said web and maintain said web in taut stretched position across said platen.

3. A paper feed apparatus according to claim 1 in which said paper web is pre-printed with individual data recording forms of given length and in which, on one edge of said paper web, there is one indexing aperture located in precisely fixed relation to each of said individual data recording forms.

4. A paper feed apparatus for a graphic communication recording system according to claim 2, in which said second static tensioning device comprises a paper feed roll and two tensioning rolls with resilient biasing means pressing said tensioning rolls against opposite edges of said paper web to maintain said paper web in edge engagement with said paper feed roll, and in which all of said tensioning devices function independently of said indexing apertures.

5. A paper feed apparatus for a graphic communication recording station of the kind in which data are recorded by a stylus moving across a segment of a paper web or other recording medium supported upon a platen, and in which paper feed is required substantially simultaneously with a directly corresponding paper feed at a remote station, using a paper web having indexing apertures spaced longitudinally thereof at a predetermined precise paper feed length, which length may vary for different webs to meet different recording requirements, said apparatus comprising: guide means for guiding said web from said supply to said platen; a paper advancing mechanism for advancing said paper web through said guide means and across said platen; tensioning means for maintaining said paper web under substantial tension within said guide means and at both ends of said platen; energizing means for energizing said paper advancing mechanism upon movement of said stylus to a predetermined location on said platen and for maintaining said paper advancing mechanism energized thereafter; detector means, coupled to said energizing means, for detecting movement of one of said indexing apertures to a given position indicative of advancement of said paper web through the predetermined paper feed length for that particular web and for de-energizing said paper advancing mechanism in response thereto; and a brake mechanism, coupled to said energizing means, for automatically braking said paper advancing mechanism immediately upon de-energination of said paper advancing means.

References Cited

UNITED STATES PATENTS

| | | | |
|---|---|---|---|
| 2,793,094 | 5/1957 | Bergson | 346—136 |
| 3,125,638 | 3/1964 | Brumbach | 346—136 |

RICHARD B. WILKINSON, *Primary Examiner.*

EDITH C. SIMMONS, *Assistant Examiner.*